United States Patent
Chang et al.

(10) Patent No.: US 11,225,098 B2
(45) Date of Patent: Jan. 18, 2022

(54) SYSTEM OF ASSESSING PERFORMANCE OF A PHOTOCURING LIGHT SOURCE FOR A PRINTING MACHINE AND A COMBINATION HAVING SAME

(71) Applicant: Printing Technology Research Institute, New Taipei (TW)

(72) Inventors: Shih-Chang Chang, New Taipei (TW); Chia-Bin Chueh, New Taipei (TW); Kang-Yu Liu, New Taipei (TW); Yen-Ping Wang, New Taipei (TW)

(73) Assignee: PRINTING TECHNOLOGY RESEARCH INSTITUTE, New Taipei (TW)

(*) Notice: Subject to any disclaimer, the term of this patent is extended or adjusted under 35 U.S.C. 154(b) by 134 days.

(21) Appl. No.: 16/828,386

(22) Filed: Mar. 24, 2020

(65) Prior Publication Data
US 2021/0187985 A1 Jun. 24, 2021

(30) Foreign Application Priority Data
Dec. 19, 2019 (TW) ................................. 108146735

(51) Int. Cl.
*B41J 29/393* (2006.01)
*H05B 47/20* (2020.01)

(52) U.S. Cl.
CPC ............ *B41J 29/393* (2013.01); *H05B 47/20* (2020.01)

(58) Field of Classification Search
CPC ................................. B41J 29/393; H05B 47/20
See application file for complete search history.

(56) References Cited

U.S. PATENT DOCUMENTS 6,153,873 A * 11/2000 Wolf .................. G01N 15/0205
250/208.1
6,266,141 B1 * 7/2001 Morita ...................... G01J 4/04
356/365

* cited by examiner

*Primary Examiner* — Lamson D Nguyen
(74) *Attorney, Agent, or Firm* — Birch, Stewart, Kolasch & Birch, LLP

(57) ABSTRACT

A system of assessing performance of a photocuring light source includes a photocuring light source unit, a light source control unit, a sensing unit, and a computer unit. The light source unit produces light rays on a work platform of a printing machine. The light source control unit is electrically coupled to and controls the light source unit. The sensing unit is disposed proximally to the light source unit to detect power of the light rays from the light source unit. The computer unit is electrically coupled to the sensing unit and the light source control unit to control the light source unit and record the power of the light rays and operating period of the light source unit. A combination having the system is also disclosed.

11 Claims, 2 Drawing Sheets

SYSTEM OF ASSESSING PERFORMANCE OF A PHOTOCURING LIGHT SOURCE FOR A PRINTING MACHINE AND A COMBINATION HAVING SAME

CROSS-REFERENCE TO RELATED APPLICATION

This application claims priority to Taiwanese Patent Application No. 108146735, filed on Dec. 19, 2019.

FIELD

The disclosure relates to a system of assessing performance of a photocuring light source for a printing machine and a combination having same.

BACKGROUND

During printing process, a printing plate with an image or pattern is inked so that the image or pattern is printed to a printable material by a pressure transfer method.

An ultraviolet curable ink is popularly used because it can be applied to diverse materials and can be dried in a short time period by radiation of ultraviolet light rays from an ultraviolet light emitting source.

However, the ultraviolet light rays from an ultraviolet light emitting source can be attenuated over time and become inefficient to cure and dry the ultraviolet curable ink. Frequent manual inspections are required for examining the power of the ultraviolet light rays from the ultraviolet light emitting source. The printing efficiency is therefore unable to increase.

SUMMARY

Therefore, one object of the disclosure is to provide a system that can assess power of light rays from a photocuring light source.

According to the disclosure, a system of assessing the performance of a photocuring light source for a printing machine includes a photocuring light source unit, a light source control unit, a sensing unit, and a computer unit.

The photocuring light source unit is adapted for producing light rays on a work platform of the printing machine.

The light source control unit is electrically coupled to and controls the photocuring light source unit.

The sensing unit is disposed proximally to the photocuring light source unit to detect power of the light rays from the photocuring light source unit.

The computer unit is electrically coupled to the sensing unit and the light source control unit to control and record the power of the light rays from the photocuring light source unit.

Another object of the disclosure is to provide a combination that can provide a solution to the problems encountered in the prior art.

According to another object of the disclosure, a combination includes a photocuring light source unit, a light source control unit, a sensing unit, a computer unit, and a portable device.

The photocuring light source unit is adapted for producing light rays on a work platform of a printing machine.

The light source control unit is electrically coupled to and controls the photocuring light source unit.

The sensing unit is disposed proximally to the photocuring light source unit to detect power of the light rays from the photocuring light source unit.

The computer unit is electrically coupled to the sensing unit and the light source control unit to control and record the power of the light rays from the photocuring light source unit. The computer unit is capable of transmitting a data unit.

The portable device has a smart measuring and testing program. The computer unit transmits the data unit in a wireless or wired manner to the portable device. The portable device displays the data unit received from the computer unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
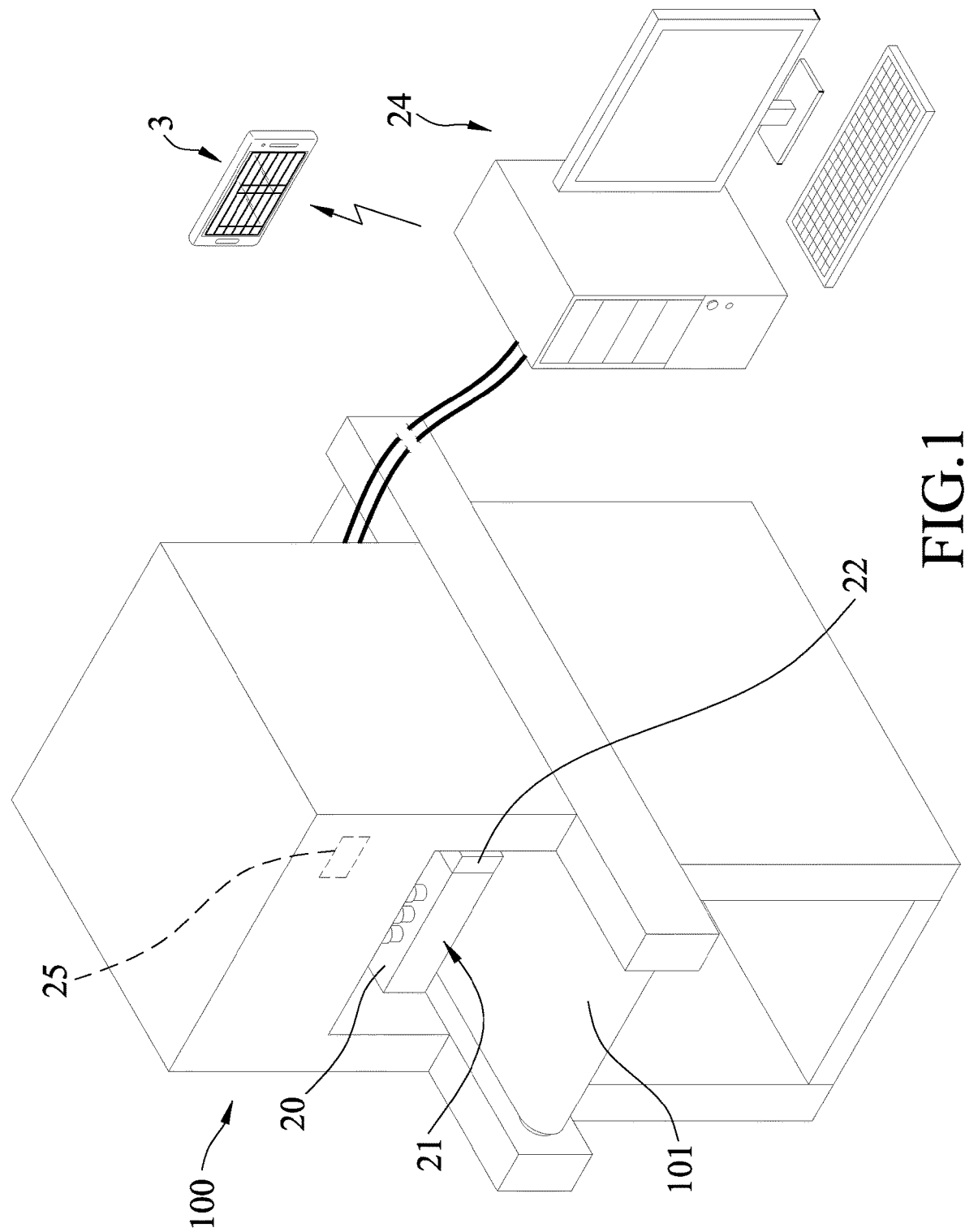
FIG. 1 is a perspective view illustrating a combination according to an embodiment of the disclosure for assessing the performance of a photocuring light source for a printing machine.
Figure 2:
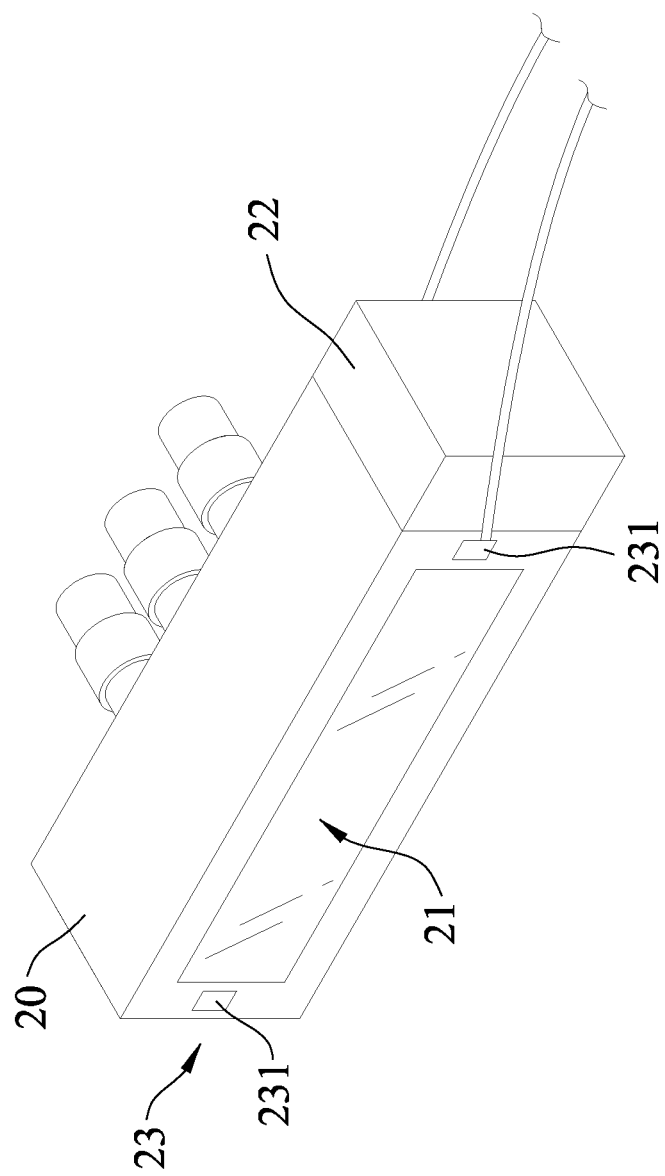
FIG. 2 is a fragmentary view of the embodiment, illustrating a housing, a photocuring light source unit, a light source control unit, and a sensing unit.

FIGS. 1 and 2 illustrate a combination according to an embodiment of the disclosure for assessing the performance of a photocuring light source for a printing machine 100. The combination of the disclosure includes a housing 20, a photocuring light source unit 21, a light source control unit 22, a sensing unit 23, a computer unit 24, a printing machine control module 25, and a portable device 3.

The housing 20 is disposed on a work platform 101 of the printing machine 100.

The photocuring light source unit 21 is disposed within the housing 20 to produce light rays on the work platform 101. In this embodiment, the photocuring light source unit 21 includes ultraviolet (UV) light-emitting diodes (LED) that produce UV light rays. When a UV curable product (not shown) is placed on the work platform 101, it can be cured and dried by the light rays of the photocuring light source unit 21.

The light source control unit 22 is electrically coupled to and controls the photocuring light source unit 21.

The sensing unit 23 includes, but is not limited to, two sensing members 231 disposed on the housing 20 proximally to the photocuring light source unit 21 to detect power of the light rays from the photocuring light source unit 21. While the number of the sensing member 231 is two in this embodiment, the number of the sensing member 231 can be one or more than two in other embodiments.

The computer unit 24 is electrically coupled to the sensing unit 23 and the light source control unit 22 to control and record the power of the light rays from the photocuring light source unit 21. In addition, the computer unit 24 records the operating period of the photocuring light source unit 21.

Aside from the sensing unit 23 detecting power of the light rays from the photocuring light source unit 21, depending on the type of the printable material and of the ink used for printing, the sensing unit 23 cooperating with the computer unit 24 and the light source control unit 22 can adjust the power of the light rays from the photocuring light source unit 21 for optimization of curing effects.

The printing machine control module 25 is disposed on the printing machine 100. The computer unit 24 is electrically coupled to the printing machine control module 25. During operation of the printing machine 100, through the printing machine control module 25, the computer unit 24 performs error detection and records the mechanical error information of the printing machine 100.

The portable device 3 has a smart measuring and testing program. The computer unit 24 is capable of transmitting a data unit in a wireless or wired manner to the portable device 3. When the data unit is transmitted to the portable device 3, the portable device 3 displays the data unit received from the computer unit 24 through the smart measuring and testing program. In this embodiment, the data unit includes the power of the light rays of the photocuring light source unit 21, and the mechanical error information, voltage, current, operating period, power, or temperature of the printing machine 100.

In use, through the light source control unit 22, the computer unit 24 records not only the power of the light rays from the photocuring light source unit 21 detected by the the sensing unit 23, but also the operating period of the photocuring light source unit 21. With the computer unit 14, a user can be aware of power attenuation status and use life of the photocuring light source unit 21. This information will alarm the user to replace the photocuring light source unit. By virtue of the computer unit 24 cooperating with the printing machine control module 25, the user can perceive the mechanical error information of the printing machine 100, which may let the user to determine whether the photocuring light source unit 21 would collide with the product. Therefore, the production efficiency may be evaluated and the defective product rate may be reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A system of assessing the performance of a photocuring light source for a printing machine, the system comprising:
   a photocuring light source unit for producing light rays on a work platform of the printing machine;
   a light source control unit electrically coupled to and controlling said photocuring light source unit;
   a sensing unit disposed proximally to said photocuring light source unit to detect power of the light rays from said photocuring light source unit; and
   a computer unit electrically coupled to said sensing unit and said light source control unit to control and record the power of the light rays from said photocuring light source unit.

2. The system as claimed in claim 1, further comprising a housing, said photocuring light source unit being disposed within said housing, said sensing unit including at least one sensing member disposed on said housing proximally to said photocuring light source unit.

3. The system as claimed in claim 2, wherein said at least one sensing member includes a plurality of sensing members disposed on said housing proximally to said photocuring light source unit.

4. The system as claimed in claim 1, wherein said computer unit records the operating period of said photocuring light source unit.

5. The system as claimed in claim 1, further comprising a printing machine control module, said computer unit being electrically coupled to said printing machine module to record mechanical error information of the printing machine.

6. The system as claimed in claim 1, wherein said computer unit transmits a data unit in a wireless or wired manner, said data unit including the power of said light rays from said photocuring light source.

7. A combination comprising:
   a photocuring light source unit for producing light rays on a work platform of a printing machine;
   a light source control unit electrically coupled to and controlling said photocuring light source unit;
   a sensing unit disposed proximally to said photocuring light source unit to detect power of the light rays from said photocuring light source unit;
   a computer unit electrically coupled to said sensing unit and said light source control unit to control and record the power of the light rays from said photocuring light source unit, said computer unit capable of transmitting a data unit; and
   a portable device having a smart measuring and testing program, said computer unit transmitting said data unit in a wireless or wired manner to said portable device, said portable device displaying said data unit received from said computer unit.

8. The combination as claimed in claim 7, further comprising a housing, said photocuring light source unit being disposed within said housing, said sensing unit including at least one sensing member disposed on said housing proximally to said photocuring light source unit.

9. The combination as claimed in claim 8, wherein said computer unit records the operating period of said photocuring light source unit.

10. The combination as claimed in claim 9, further comprising a printing machine control module, said computer unit being electrically coupled to said printing machine control module and recording mechanical error information of the printing machine.

11. The combination as claimed in claim 10, wherein said data unit displayed by said portable device includes the power of the light rays of said photocuring light source unit, and the mechanical error information, voltage, current, operating period, power, or temperature of the printing machine.

* * * * *